US007509095B2

(12) United States Patent
Chien et al.

(10) Patent No.: US 7,509,095 B2
(45) Date of Patent: Mar. 24, 2009

(54) METHOD AND SYSTEM FOR IDENTIFYING OCCURRENCE OF SHADOWING PHENOMENON DURING WIRELESS COMMUNICATIONS

(76) Inventors: Cheng-Hao Chien, 9F-2, No. 23, Kuang-Fu S. Rd., Taipei (TW); Hau-Tieng Wu, No. 9, Lane 403, Yang-Ming Rd., San-Min Dist., Kaohsiung (TW)

( * ) Notice: Subject to any disclaimer, the term of this patent is extended or adjusted under 35 U.S.C. 154(b) by 534 days.

(21) Appl. No.: 11/285,119

(22) Filed: Nov. 21, 2005

(65) Prior Publication Data

US 2006/0111101 A1 May 25, 2006

(30) Foreign Application Priority Data

Nov. 23, 2004 (TW) ............................... 93135983 A

(51) Int. Cl.
*H04B 1/00* (2006.01)
*H04B 15/00* (2006.01)
(52) U.S. Cl. ................ 455/63.1; 455/67.11; 455/67.14; 455/67.16; 455/226.1; 375/224; 375/225; 375/226
(58) Field of Classification Search ................ 375/224, 375/225, 226; 455/63.1, 67.1, 67.14, 67.16, 455/226.1, 226.11
See application file for complete search history.

(56) References Cited

U.S. PATENT DOCUMENTS

| 6,389,294 B1* | 5/2002 | Sipila ........................ 455/506 |
| 6,956,814 B1* | 10/2005 | Campanella ................ 370/210 |
| 2005/0208897 A1* | 9/2005 | Lyons et al. ............. 455/67.11 |
| 2007/0047678 A1* | 3/2007 | Sibecas et al. ............. 375/343 |

* cited by examiner

*Primary Examiner*—Nay A Maung
*Assistant Examiner*—Ping Y Hsieh

(57) ABSTRACT

A method for identifying occurrence of shadowing phenomenon is to be implemented using a wireless communications system that includes signal transmitting and receiving devices. The signal-receiving device periodically executes a synchronization process to evaluate quality of wireless communications conducted through a signal transmission path between the signal transmitting and receiving devices. A set of signal-state estimated values that includes phase and power parameters is generated during each synchronization process. The method includes: collecting the phase parameters for a number of the synchronization processes; generating a set of Poincaré coordinate data from the collected phase parameters; analyzing distribution of the set of Poincaré coordinate data on a Poincaré map; and determining that the signal transmission path is experiencing a shadowing phenomenon in case of a non-elliptical distribution.

12 Claims, 5 Drawing Sheets

METHOD AND SYSTEM FOR IDENTIFYING OCCURRENCE OF SHADOWING PHENOMENON DURING WIRELESS COMMUNICATIONS

CROSS-REFERENCE TO RELATED APPLICATION

This application claims priority of Taiwanese application no. 093135983, filed on Nov. 23, 2004.

BACKGROUND OF THE INVENTION

1. Field of the Invention

The invention relates to a method and system for wireless communications, more particularly to a method and system for real-time identification of occurrence of shadowing phenomenon during wireless communications.

2. Description of the Related Art

In recent years, due to the conveniences of mobility and less restrictions on communications locations offered by wireless communications, people have become accustomed to using wireless communications to communicate with others. For example, people own at least one mobile phone. In addition, wireless network cards have become a basic component of new consumer electronic products.

When a wireless signal transmission path is blocked due to interference by an obstacle (such as a building) there will be a substantial loss in signal power. This phenomenon is known as fading, which is considered to be a very important phenomenon in the field of wireless communications. There are two main types of fading, i.e., fast fading and long-time fading. Long-time fading is also known as shadowing. Many schemes, such as error control coding and re-transmission, have been proposed heretofore to mitigate the effects of fast fading. In some voice channel applications, the effects of fast fading are actually ignored because they usually do not affect communications content among humans. However, shadowing cannot be ignored because it may last for a considerable amount of time and may result in abrupt failure in communications.

In order to ensure the quality of wireless communications, a signal-receiving device of user end equipment (such as a mobile phone) or system service end equipment (such as a base station) will periodically execute a synchronization process to generate a set of channel-transmission-state estimated values that includes power and phase parameters, such as those defined in Section 5.1 of ETSI TS 125 211 V6.4.0 (March, 2005), for correcting the effects of wireless signal transmission paths on transmitted signals. At present, since actual changes in phase parameters during real world communications are complex and difficult to analyze, majority of current communications system service end equipments refer solely to the power parameters as basis for evaluating quality of wireless communications and for determining whether handoff between base stations should be conducted. For instance, mobile phones will periodically transmit Keep_Alive signals to base stations, and base stations respond to the Keep_Alive signals by sending ACKnowledge signals to mobile phones. However, when the signal transmission path between a base station and a mobile phone is blocked, the shadowing phenomenon occurs, and the mobile phone that was unable to receive the ACKnowledge signal will automatically increase the transmission power for the Keep_alive signal to a maximum and adjust the frequency of transmissions of the Keep_Alive signal to a maximum, thereby resulting in large consumption of power resources of the mobile phone. In the case that the signal transmission path experiences complete shadowing phenomenon, such as when the mobile phone is inside an elevator, the above tasks performed by the mobile phone result in wasteful power consumption, and do not lead to an improvement in communications quality.

SUMMARY OF THE INVENTION

Therefore, the object of the present invention is to provide a method and system for identifying occurrence of shadowing phenomenon during wireless communications to achieve advantages, such as reduction in power consumption and possibility of conducting handoff between base stations at an earlier time.

According to one aspect of the present invention, a method for identifying occurrence of shadowing phenomenon is to be implemented using a wireless communications system that includes a signal-transmitting device and a signal-receiving device. The signal-receiving device periodically executes a synchronization process to evaluate quality of wireless communications conducted through a signal transmission path between the signal-transmitting device and the signal-receiving device. A set of signal-state estimated values that includes at least a phase parameter and a power parameter is generated during each synchronization process. The method comprises the steps of:

a) collecting the phase parameters for a number of the synchronization processes;

b) generating a set of Poincaré coordinate data from the phase parameters collected in step a);

c) analyzing distribution of the set of Poincaré coordinate data generated in step b) on a Poincaré map; and d) determining that the signal transmission path is experiencing a shadowing phenomenon when the set of Poincaré coordinate data generated in step b) has a non-elliptical distribution on the Poincaré map, and that the signal transmission path is not experiencing the shadowing phenomenon when the set of Poincaré coordinate data generated in step b) has an elliptical distribution on the Poincaré map.

According to another aspect of the present invention, a signal-receiving device is capable of identifying occurrence of shadowing phenomenon and is adapted for use in a wireless communications system. The wireless communications system includes a signal-transmitting device capable of wireless communications with the signal-receiving device. The signal-receiving device comprises:

a main system for periodically executing a synchronization process to evaluate quality of wireless communications conducted through a signal transmission path between the signal-transmitting device and the signal-receiving device, a set of signal-state estimated values that includes at least a phase parameter and a power parameter being generated during each synchronization process; and an identification module coupled to the main system and configured to collect the phase parameters for a number of the synchronization processes, to generate a set of Poincaré coordinate data from the phase parameters collected thereby, to analyze distribution of the set of Poincaré coordinate data on a Poincaré map, and to determine that the signal transmission path is experiencing a shadowing phenomenon when the set of Poincaré coordinate data analyzed thereby has a non-elliptical distribution on the Poincaré map, and that the signal transmission path is not experiencing the shadowing phenomenon when the set of Poincaré coordinate data analyzed thereby has an elliptical distribution on the Poincaré map.

According to still another aspect of the present invention, a wireless communications system capable of identifying occurrence of shadowing phenomenon comprises:

user end equipment including a user signal-receiving device and a user signal-transmitting device; and system service end equipment including a system signal-transmitting device capable of wirelessly transmitting signals to be received by the user signal-receiving device, and a system signal-receiving device capable of wirelessly receiving signals transmitted by the user signal-transmitting device.

At least one of the user signal-receiving device and the system signal-receiving device periodically executes a synchronization process to evaluate quality of wireless communications conducted through a signal transmission path between said at least one of the user signal-receiving device and the system signal-receiving device, and the corresponding one of the system signal-transmitting device and the user signal-transmitting device. A set of signal-state estimated values that includes a phase parameter is generated during each synchronization process.

Said at least one of the user signal-receiving device and the system signal-receiving device collects the phase parameters for a number of the synchronization processes, generates a set of Poincaré coordinate data from the phase parameters collected thereby, analyzes distribution of the set of Poincaré coordinate data generated thereby on a Poincaré map, and determines that the signal transmission path is experiencing a shadowing phenomenon when the set of Poincaré coordinate data analyzed thereby has a non-elliptical distribution on the Poincaré map, and that the signal transmission path is not experiencing the shadowing phenomenon when the set of Poincaré coordinate data analyzed thereby has an elliptical distribution on the Poincaré map.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

In order to solve the drawbacks of the prior art associated with failure to detect occurrence of the shadowing phenomenon, the applicant of the present invention proposes to utilize the phase parameters generated during synchronization processes when conducting wireless communications, together with Poincaré mapping techniques, to identify whether a signal transmission path is experiencing the shadowing phenomenon with accuracy such that handoff or other tasks may be conducted at an earlier time.

Figure 1:
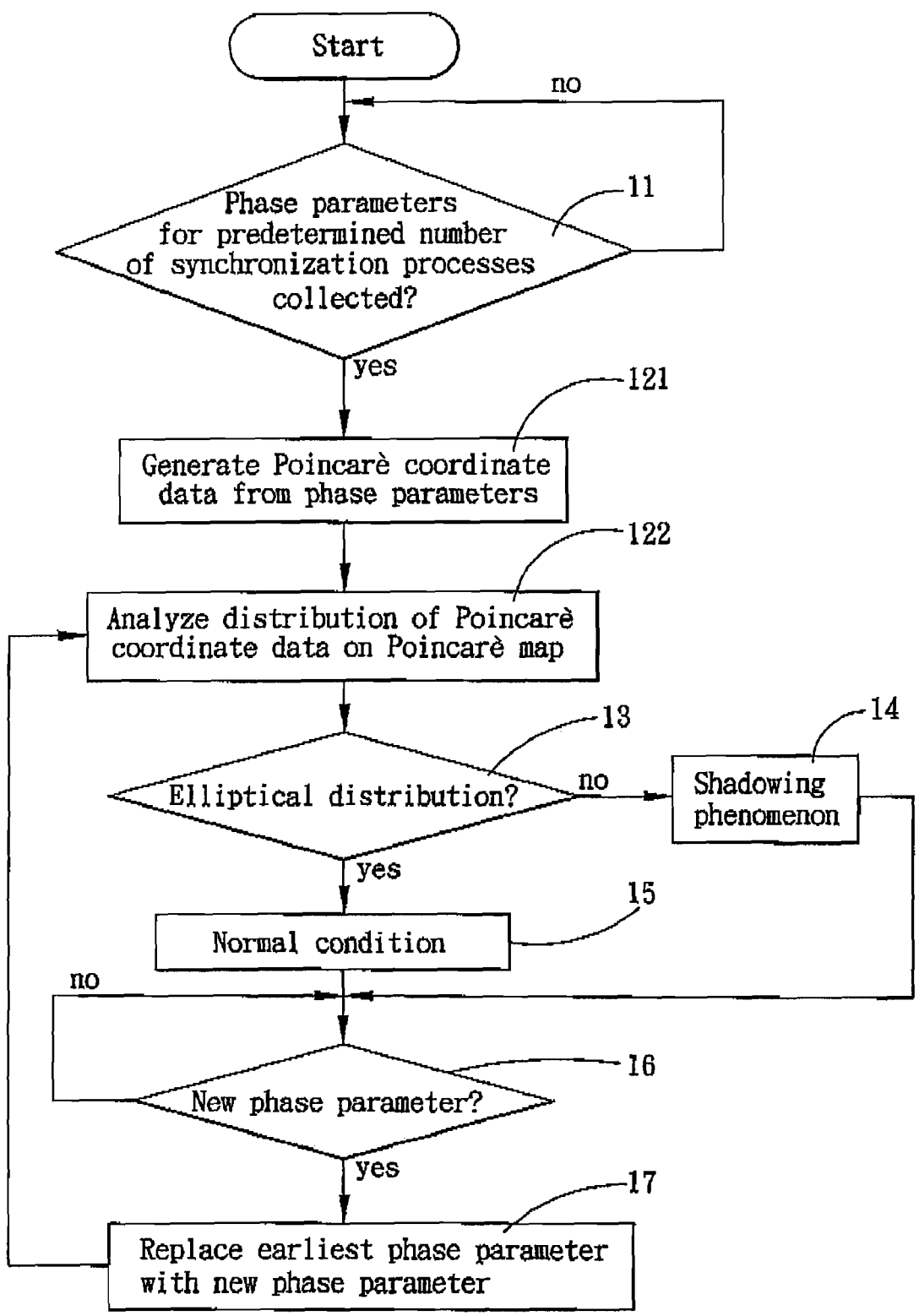
FIG. 1 is a flowchart to illustrate consecutive steps of the preferred embodiment of a method for identifying occurrence of shadowing phenomenon during wireless communications according to the present invention.

FIG. 1 is a flowchart to illustrate the preferred embodiment of the method for identifying occurrence of the shadowing phenomenon in a signal transmission path according to this invention.

Figure 3:
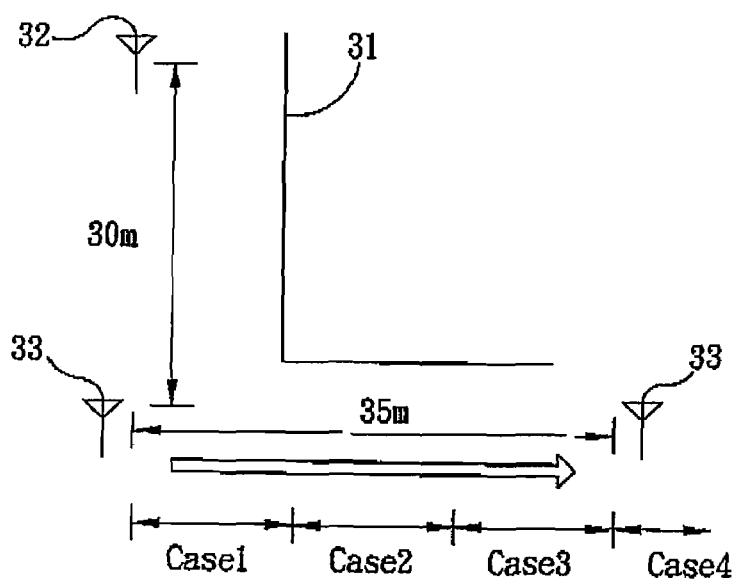
FIG. 3 is a schematic diagram of an exemplary wireless communications environment to illustrate the method of the preferred embodiment.

In order to facilitate understanding of the preferred embodiment, before the method of the preferred embodiment is described in greater detail, an exemplary wireless communications environment will be first described herein with reference to FIG. 3 to help illustrate the concept of the method of the preferred embodiment.

FIG. 3 illustrates a building 31 with a corner, a receiver 32 disposed at a first side of the building 31, and a transmitter 33 disposed at a second side of the building 31. The transmitter 33 is 30 m away from the receiver 32 in a measuring direction parallel to the first side of the building 31 when the transmitter 33 is at an initial position. The receiver 32 is fixed in its position, whereas the transmitter 33 is moved a distance of 35 m from the initial position in a direction parallel to the second side of the building 31. During movement of the transmitter 33, the presence of the building 31 affects signal reception of the receiver 32. As a result, there are four cases that arise during movement of the transmitter 33. The first case is a normal case (Case 1) where shadowing phenomenon has yet to occur, and the transmitter 33 can transmit direct waves to the receiver 32 without interference from the building 31. The shadowing phenomenon is experienced in the other three cases. In particular, the second case is a mild shadowing case (Case 2) where the signal transmission path between the transmitter 33 and the receiver 32 is partially blocked by the building 31. The third case is a severe shadowing case (Case 3) where, while the signal transmission path between the transmitter 33 and the receiver 32 has experienced severe shadowing phenomenon, the receiver 32 can still receive signals from the transmitter 33. The fourth case is a complete shadowing case (Case 4) where the transmitter 33 has moved 35 m from the initial position, and the signal transmission path between the transmitter 33 and the receiver 32 is completely blocked by the building 31. The receiver 32 only receives white noise at this time.

In the exemplary wireless communications environment of FIG. 3, the signal frequency is 2.4 GHz, and the transmitter 33 continuously transmits signals and the receiver 32 continuously receives signals. The phase parameters of signal-state estimated values in the signals received by the receiver 32 are then collected to generate Poincaré coordinate data that are subsequently analyzed in terms of their distribution on a Poincaré map.

Figure 4:
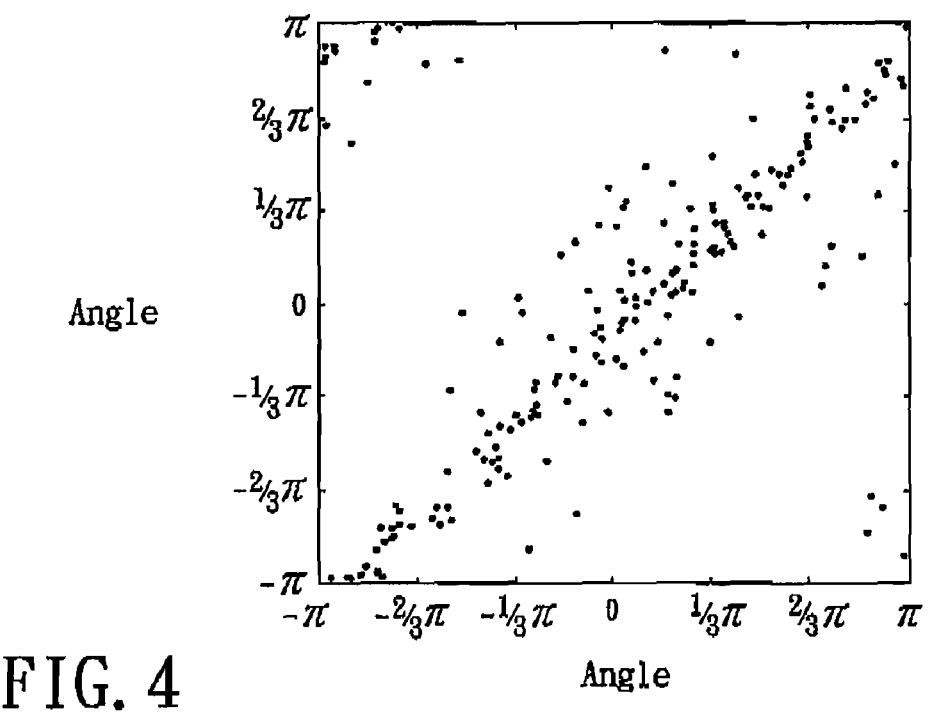
FIG. 4 is a Poincaré map for the example of FIG. 3, illustrating a case where the shadowing phenomenon has yet to occur.
Figure 5:
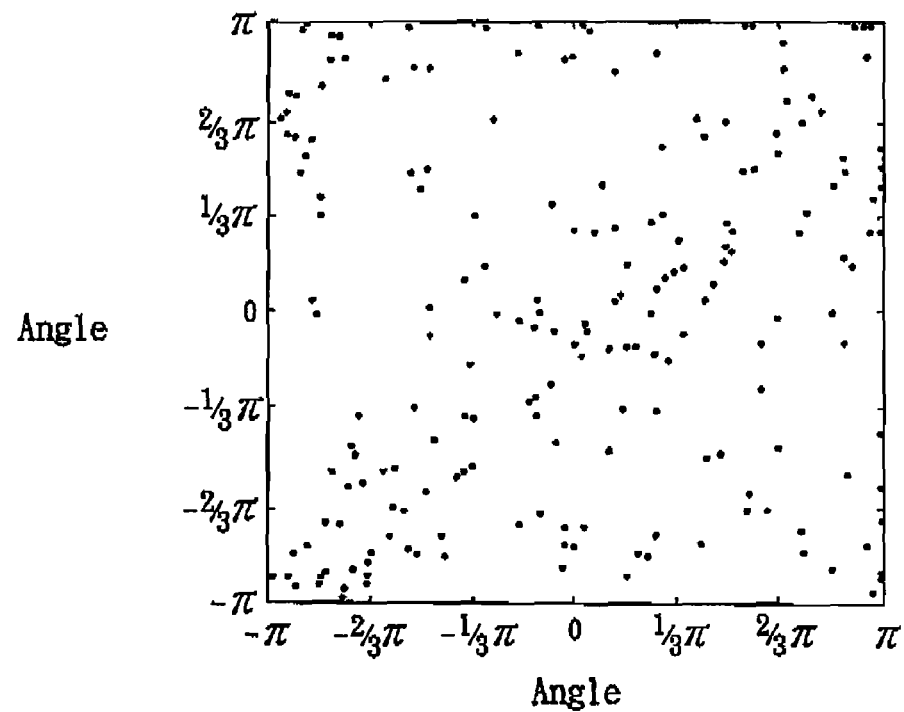
FIG. 5 is another Poincaré map for the example of FIG. 3, illustrating a case where mild shadowing phenomenon has occurred.
Figure 6:
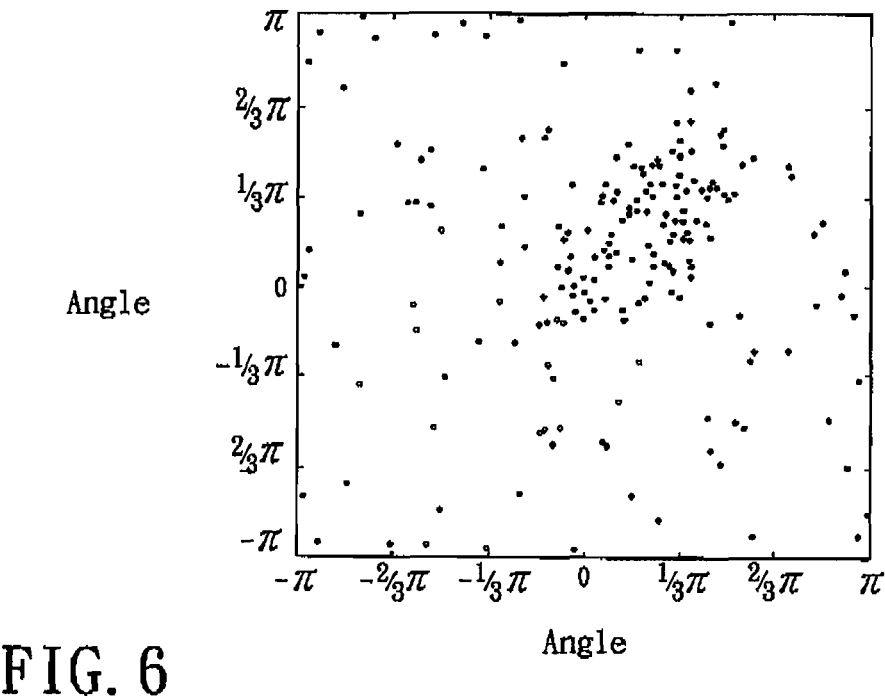
FIG. 6 is yet another Poincaré map for the example of FIG. 3, illustrating a case where severe shadowing phenomenon has occurred.

From experimental results, for the aforementioned Case 1 condition, the Poincaré coordinate data generated from the phase parameters thus collected have an elliptical distribution on the Poincaré map, as best shown in FIG. 4. For the aforementioned Case 2 condition, the Poincaré coordinate data generated from the phase parameters thus collected are uniformly distributed throughout the Poincaré map, as best shown in FIG. 5. For the aforementioned Case 3 condition, majority of the Poincaré coordinate data generated from the phase parameters thus collected have a circular distribution on the Poincaré map, as best shown in FIG. 6. For the aforementioned Case 4 condition, the distribution of the Poincaré coordinate data generated from the phase parameters thus collected is similar to that shown in FIG. 5, where the Poincaré coordinate data are uniformly distributed throughout the Poincaré map. It is thus evident from the foregoing that the distribution of the Poincaré coordinate data generated from the phase parameters thus collected on the Poincaré map will vary with the condition of the signal transmission path. Therefore, in the method of the preferred embodiment, by analyzing the distribution of the Poincaré coordinate data generated from the phase parameters thus collected on the Poincaré map, it is possible to identify the current condition of the signal transmission path.

Figure 7:
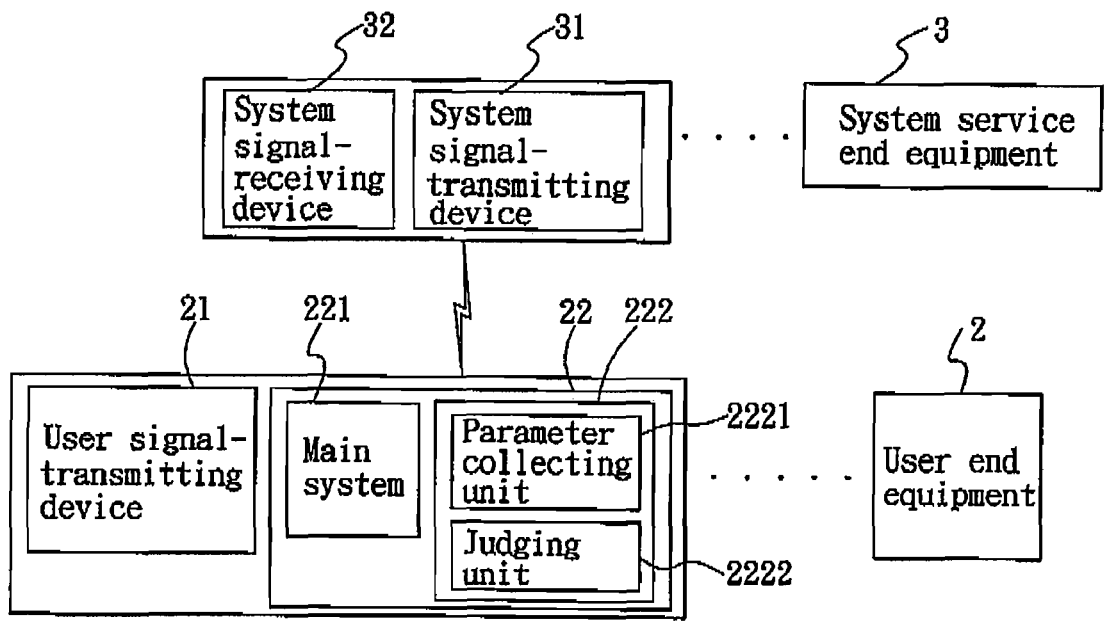
FIG. 7 is a block diagram to illustrate the preferred embodiment of a wireless communications system capable of identifying occurrence of shadowing phenomenon according to the present invention.
Figure 8:
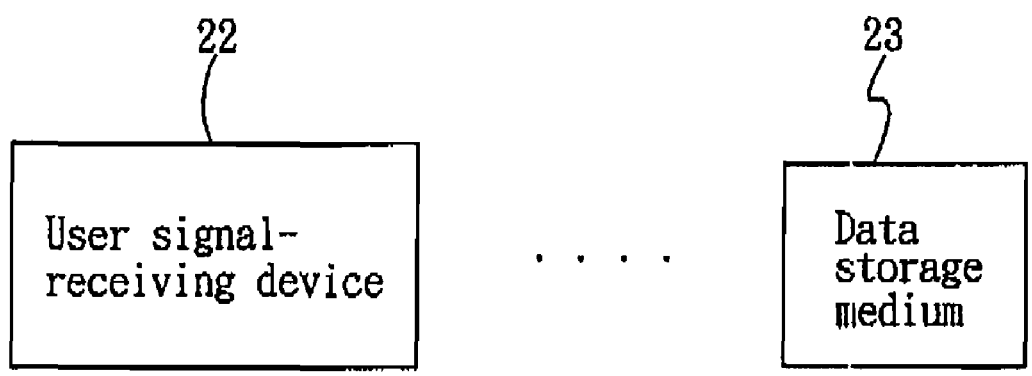
FIG. 8 is a block diagram that illustrates the communication between the user signal-receiving device and the data storage medium.

The method of the preferred embodiment will now be described with reference to FIG. 1. The method of the preferred embodiment is to be implemented using a wireless communications system, such as that shown in FIG. 7. The wireless communications system includes a plurality of system service end equipments 3 and a plurality of user end equipments 2. When the wireless communications system is in an idle state, each user end equipment 2 will continuously execute a synchronization process, where the user end equipment 2 transmits a Keep_Alive signal for reception by the corresponding system service end equipment 3. Theoretically, in response to the Keep_Alive signal received thereby, the system service end equipment 3 transmits an ACKnowledge signal for reception by the corresponding user end equipment 2. Therefore, when the signal transmission path between the user and service end equipments 2,3 is not blocked, the user end equipment 2 is able to receive the ACKnowledge signal transmitted by the corresponding system service end equipment 3. The set of signal-state estimated values generated during each synchronization process includes at least a phase parameter and a power parameter. In this embodiment, the phase parameters for a number of the synchronization processes are collected and stored. In 3G communications systems, sixteen synchronization processes are executed within an interval of 10 milliseconds. In GSM communications systems, one synchronization process is executed every 16 milliseconds.

In step 11 of the method of the preferred embodiment, it is determined if the phase parameters for a predetermined number (such as 300) of the synchronization processes have been collected. The flow proceeds to step 121 if affirmative. Otherwise, step 11 is repeated until the phase parameters for the predetermined number of the synchronization processes have been collected.

In step 121, a set of Poincaré coordinate data, each corresponding to a temporally adjacent pair of the phase parameters thus collected, is generated to result in points on a Poincaré map. In the case where 300 phase parameters (i.e., $\theta_1$ to $\theta_{300}$) were collected, 299 Poincaré coordinate data, i.e., $(\theta_1, \theta_2), (\theta_2, \theta_3) (\theta_3, \theta_4) \ldots (\theta_{299}, \theta_{300})$, are generated for the Poincaré map.

Subsequently, in step 122, the distribution of the set of Poincaré coordinate data thus generated on the Poincaré map is analyzed.

Thereafter, in step 13, it is determined if the set of Poincaré coordinate data has an elliptical distribution on the Poincaré map. If the set of Poincaré coordinate data has a non-elliptical distribution on the Poincaré map, the signal transmission path is determined as experiencing a shadowing phenomenon in step 14. On the other hand, if the set of Poincaré coordinate data has an elliptical distribution on the Poincaré map, the signal transmission path is determined as having a normal condition, i.e., Case 1, in step 15. The flow proceeds to step 16 after step 14 or step 15. Therefore, in the method of the preferred embodiment, the distribution of the Poincaré coordinate data generated from the phase parameters thus collected on the Poincaré map are analyzed to effectively identify whether the signal transmission path is experiencing the shadowing phenomenon. Based on the identification results, the wireless communications system can execute appropriate post-identification tasks (to be described in the succeeding paragraphs).

In step 16, it is determined whether a new phase parameter associated with a latest synchronization process has been collected. If no, step 16 is repeated. Otherwise, step 17 is performed such that the new phase parameter replaces the phase parameter associated with an earliest synchronization process. In particular, if a new phase parameter $\theta_j$ associated with latest execution of the synchronization process has been collected, a new Poincaré coordinate data $(\theta_{j-1}, \theta_j)$ is generated to replace an earliest Poincaré coordinate data, which is $(\theta_{j-1-N}, \theta_{j-N})$ under the condition that the collected number of the phase parameters is N.

After step 17, the flow goes back to step 122 to analyze the distribution of the updated set of Poincaré coordinate data on the Poincaré map.

Figure 2:
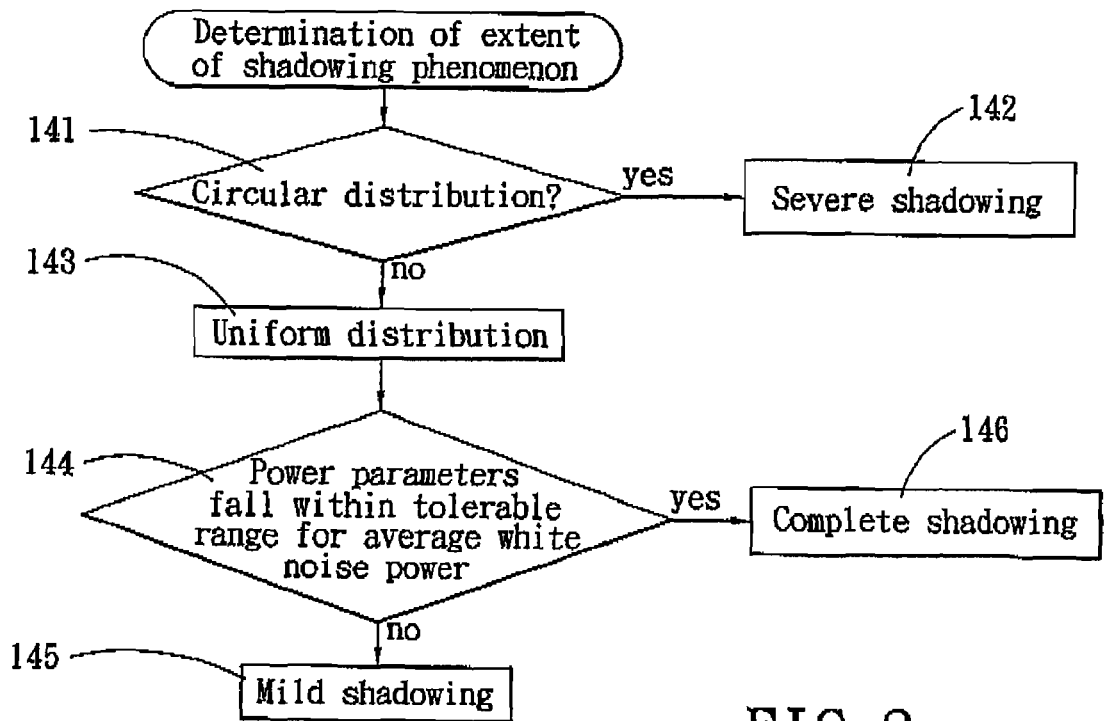
FIG. 2 is a flowchart to illustrate how extent of the shadowing phenomenon is determined in the method of the preferred embodiment.

As mentioned hereinabove, the extent of the shadowing phenomenon experienced by the signal transmission path can be classified into the Case 2, Case 3 or Case 4 condition. Therefore, when it was determined in step 13 of the method of the preferred embodiment that the set of Poincaré coordinate data generated from the phase parameters thus collected has a non-elliptical distribution on the Poincaré map, the sub-steps of step 14 as shown in FIG. 2 may be executed to determine the extent of the shadowing phenomenon experienced by the signal transmission path.

Initially, in sub-step 141, it is determined if the set of Poincaré coordinate data has a circular distribution on the Poincaré map. In the affirmative, sub-step 142 is executed to identify the signal transmission path as experiencing a severe shadowing condition (Case 3).

The flow proceeds to sub-step 143 if it was determined in sub-step 141 that the set of Poincaré coordinate data does not have a circular distribution on the Poincaré map. In sub-step 143, it is determined that the set of Poincaré coordinate data has a uniform distribution on the Poincaré map. This means that the signal transmission path is experiencing either a mild shadowing condition (Case 2) or a complete shadowing condition (Case 4). Since only white noise is received in the case of the complete shadowing condition, the power for the mild shadowing condition (Case 2) is higher than that for the complete shadowing condition (Case 4). Therefore, by referring to the power parameters of the synchronization processes, it is possible to distinguish between the Case 2 and Case 4 conditions in the method of the preferred embodiment.

In particular, an average value of the power parameters that correspond to the phase parameters collected beforehand is obtained in sub-step 143. In some conventional communications applications, the communications system will estimate the average power ($P_w$) of white noise in the environment. When a communications equipment is taken outdoors after being in use indoors for a period of time, exposure to sunlight will result in an increase in white noise power. Therefore, aside from estimating the average power ($P_w$), the communications equipment will further calculate a variance value. In this embodiment, a tolerable range for white noise average power is defined $P_w$±total dispersion.

Thereafter, in sub-step 144, it is determined if the power parameters fall within the tolerable range for the white noise average power. In the negative, sub-step 145 is executed to identify the signal transmission path as experiencing a mild shadowing condition (Case 2). Otherwise, sub-step 146 is executed to identify the signal transmission path as experiencing a complete shadowing condition (Case 4).

It is evident from the foregoing that, in the method of the preferred embodiment, it is possible to further identify the condition of the signal transmission path as Case 2, Case 3 or Case 4 according to the extent of the shadowing phenomenon so that post-identification tasks may be executed accordingly. For example, upon identification of the mild shadowing condition (Case 2) of the signal transmission path, the wireless communications system can make early arrangements to establish another signal transmission path to ensure optimum communications quality, or to prepare to interrupt wireless communications to conserve power resources. Upon identification of the severe shadowing condition (Case 3) of the signal transmission path, the wireless communications system can establish another signal transmission path to ensure optimum communications quality, or to interrupt temporarily wireless communications until the distribution of the set of Poincaré coordinate data generated from the phase parameters thus collected is restored to the Case 1 condition or the Case 2 condition in order to avoid waste of limited power resources. Similarly, upon identification of the complete shadowing condition (Case 4) of the signal transmission path, wireless communications are temporarily interrupted until the distribution of the set of Poincaré coordinate data generated from the phase parameters thus collected is restored to the Case 1 condition or the Case 2 condition so as to effectively conserve limited power resources.

The method of the preferred embodiment utilizes techniques, such as Largest Lyapnov Exponent (LLE) and Regression Analysis, for calculations. The following example is provided solely for illustrative purposes.

Initially, Poincaré coordinate data for the Poincaré map are generated from the phase parameters associated with the predetermined number of synchronization processes. As mentioned hereinabove, each Poincaré coordinate datum corresponds to a temporally adjacent pair of the phase parameters.

During calculations, the matrix of Poincaré coordinate data is first multiplied by the following matrix to rotate the original X and Y-axes of the Poincaré map by 45 degrees:

$$\begin{bmatrix} \frac{\sqrt{2}}{2} & -\frac{\sqrt{2}}{2} \\ \frac{\sqrt{2}}{2} & \frac{\sqrt{2}}{2} \end{bmatrix}$$

Then, all Poincaré coordinate data are shifted so as to be disposed in the first quadrant of the Poincaré map. This can be achieved through matrix addition utilizing a matrix with $\sqrt{2}\pi$ for all of its elements.

Thereafter, through the use of a first set of dividers parallel to the X-axis, the Poincaré map is divided into an odd number (N) of equally sized partition areas, and the number of Poincaré coordinate data in each partition area is then counted. In this example, the number (N) is equal to 1 plus twice the integer part of (F/6), where F is the signal sampling frequency.

Assuming that the number of data in each partition area is $E(S_n)$, dispersion of the Poincaré coordinate data on the Poincaré map in a first direction can be calculated as follows:

$$[E_{max}(S_j) - E_{min}(S_k) + E_{max2}(S_l) - E_{min2}(S_m)]/M,$$

where M is the total number of Poincaré coordinate data, $E_{max}(S_j)$ and $E_{max2}(S_l)$ are the largest and next largest numbers of data in the partition areas, and $E_{min}(S_k)$ and $E_{min2}(S_m)$ are the smallest and next smallest numbers of data in the partition areas.

Dispersion of the Poincaré coordinate data on the Poincaré map in a second direction transverse to the first direction is subsequently calculated in a manner similar to that described hereinabove while using a second set of dividers that are parallel to the Y-axis.

The presence or absence of the shadowing phenomenon, as well as the extent of the shadowing phenomenon, can be determined with reference to the calculated dispersions. In particular, if the dispersion in the first direction is larger than a dispersion threshold value (such as 0.2), the distribution of the Poincaré coordinate data on the Poincaré map is either circular or elliptical. Then, if the ratio of the dispersion in the first direction to that in the second direction is larger than a preset ratio (such as 1.2), the set of Poincaré coordinate data is determined to have an elliptical distribution on the Poincaré map, and the signal transmission path is determined to have a normal condition (Case 1). On the other hand, if the ratio of the dispersion in the first direction to that in the second direction is not larger than the preset ratio, the set of Poincaré coordinate data is determined to have a circular distribution on the Poincaré map, and the signal transmission path is determined as experiencing severe shadowing (Case 3).

Accordingly, if the dispersion in the first direction is not larger than the dispersion threshold value, the Poincaré coordinate data are determined to have a uniform distribution on the Poincaré map. Under this condition, the power parameters associated with the collected phase parameters are utilized to distinguish between the mild shadowing (Case 2) and complete shadowing (Case 4) conditions. In particular, if the power parameters do not fall within the tolerable range for the average white noise power, the signal transmission path is determined as experiencing mild shadowing (Case 2). Otherwise, the signal transmission path is determined as experiencing complete shadowing (Case 4).

Referring once again to FIG. 7, in the preferred embodiment of the wireless communications system according to this invention, each user end equipment 2 includes a user signal-transmitting device 21 and a user signal-receiving device 22. Each system service end equipment 3 includes a system signal-transmitting device 31 capable of wirelessly transmitting signals to be received by the user signal-receiving device 22 of the corresponding user end equipment 2, and a system signal-receiving device 32 capable of wirelessly receiving signals transmitted by the user signal-transmitting device 21 of the corresponding user end equipment 2. The wireless communications system may be a mobile phone communications system or a wireless network. The signal transmission path whose shadowing condition is to be identified can be any one of the path between a user signal-receiving device 22 and a system signal-transmitting device 31, and the path between a system signal-receiving device 32 and a user signal-transmitting device 21. In this embodiment, the user signal-receiving device 22 includes a main system 221 and an identification module 222 coupled to the main system 221. The main system 221 is responsible for data transmission and reception and for periodically executing the aforementioned synchronization process. The identification module 222 is responsible for determining the presence or absence of the shadowing phenomenon, as well as the extent of the shadowing phenomenon, based on the phase parameters generated during the synchronization processes conducted by the main system 221.

In this embodiment, the identification module 222 includes a parameter collecting unit 2221 responsible for collecting the phase parameters from the main system 221, and a judging unit 2222 responsible for generating the set of Poincaré coordinate data from the phase parameters collected by the parameter collecting unit 2221, and for analyzing the distribution of the set of Poincaré coordinate data on a Poincaré map in the manner as described hereinabove. The set of Poincaré coordinate data is updated whenever there is a new phase parameter associated with a latest synchronization process executed by the main system 221.

The judging unit 2222 determines a signal transmission path as not experiencing a shadowing phenomenon when the distribution of the set of Poincaré coordinate data on the Poincaré map is elliptical (Case 1), and as experiencing severe shadowing when the distribution of the set of Poincaré coordinate data on the Poincaré map is circular (Case 3). When the judging unit 2222 determines the distribution of the set of Poincaré coordinate data on the Poincaré map to be uniform, the parameter collecting unit 2221 further collects the power parameters associated with the collected phase parameters from the main system 221 so as to determine if the power parameters fall within the tolerable range for average white noise power. The signal transmission path is determined as experiencing mild shadowing (Case 2) when the collected power parameters do not fall within the tolerable range for average white noise power, and as experiencing complete shadowing (Case 4) when otherwise.

In other embodiments, the system signal-receiving device 32 of each system service end equipment 3 can incorporate the aforementioned identification module 222. Moreover, the user signal-receiving device 22 can be configured to execute the various steps of the method of the present invention through program instructions stored in a data storage medium (23).

It has thus been shown that, in the method and system of the present invention, not only can occurrence of the shadowing phenomenon be identified during wireless communications, the extent of the shadowing phenomenon can be identified as well. Through the identification results, the wireless communications system can make arrangements for establishing another signal transmission path at an earlier time, such that handoff can be conducted earlier to improve communications quality. The wireless communications system can also interrupt temporarily signal transmissions based on the identification results to effectively conserve power resources.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A method for identifying occurrence of shadowing phenomenon to be implemented using a wireless communications system that includes a signal-transmitting device and a signal-receiving device, the signal-receiving device periodically executing a synchronization process to evaluate quality of wireless communications conducted through a signal transmission path between the signal-transmitting device and the signal-receiving device, a set of signal-state estimated values that includes at least a phase parameter and a power parameter being generated during each synchronization process, said method comprising the steps of:
   a) collecting the phase parameters for a number of the synchronization processes;
   b) generating a set of Poincaré coordinate data from the phase parameters collected in step a);
   c) analyzing distribution of the set of Poincaré coordinate data generated in step b) on a Poincaré map; and
   d) determining that the signal transmission path is experiencing a shadowing phenomenon when the set of Poincaré coordinate data generated in step b) has a non-elliptical distribution on the Poincaré map, and that the signal transmission path is not experiencing the shadowing phenomenon when the set of Poincaré coordinate data generated in step b) has an elliptical distribution on the Poincaré map.

2. The method as claimed in claim 1, wherein, in step d), the signal transmission path is determined to experience severe shadowing when the set of Poincaré coordinate data generated in step b) has a circular distribution on the Poincaré map.

3. The method as claimed in claim 2, wherein, in step d), the signal transmission path is determined to experience mild shadowing when the set of Poincaré coordinate data generated in step b) has a uniform distribution on the Poincaré map, and the power parameters corresponding to the phase parameters collected in step a) do not fall within a tolerable range for white noise average power.

4. The method as claimed in claim 3, wherein, in step d), the signal transmission path is determined to experience complete shadowing when the set of Poincaré coordinate data generated in step b) has a uniform distribution on the Poincaré map, and the power parameters corresponding to the phase parameters collected in step a) fall within the tolerable range for average white noise power.

5. The method as claimed in claim 1, wherein, in step c), wherein distribution analysis is conducted by calculating dispersion of the set of Poincaré coordinate data generated in step b) on the Poincaré map.

6. A signal-receiving device capable of identifying occurrence of shadowing phenomenon and adapted for use in a wireless communications system, the wireless communications system including a signal-transmitting device capable of wireless communications with said signal-receiving device, said signal-receiving device comprising:
   a main system for periodically executing a synchronization process to evaluate quality of wireless communications conducted through a signal transmission path between the signal-transmitting device and said signal-receiving device, a set of signal-state estimated values that includes at least a phase parameter and a power parameter being generated during each synchronization process; and
   an identification module coupled to said main system and configured to collect the phase parameters for a number of the synchronization processes, to generate a set of Poincaré coordinate data from the phase parameters collected thereby, to analyze distribution of the set of Poincaré coordinate data on a Poincaré map, and to determine that the signal transmission path is experiencing a shadowing phenomenon when the set of Poincaré coordinate data analyzed thereby has a non-elliptical distribution on the Poincaré map, and that the signal transmission path is not experiencing the shadowing phenomenon when the set of Poincaré coordinate data analyzed thereby has an elliptical distribution on the Poincaré map.

7. The signal-receiving device as claimed in claim 6, wherein said identification module includes:
- a parameter collecting unit responsible for collecting the phase parameters; and
- a judging unit responsible for generating the set of Poincaré coordinate data from the phase parameters collected by said parameter collecting unit, and for analyzing the distribution of the set of Poincaré coordinate data on the Poincaré map.

8. A data storage medium comprising program instructions to be executed by a signal-receiving device so as to enable the signal-receiving device to execute steps of a method for identifying occurrence of shadowing phenomenon, the signal-receiving device being used in a wireless communications system, the wireless communications system including a signal-transmitting device capable of wireless communications with the signal-receiving device, the signal-receiving device periodically executing a synchronization process to evaluate quality of wireless communications conducted through a signal transmission path between the signal-transmitting device and the signal-receiving device, a set of signal-state estimated values that includes at least a phase parameter and a power parameter being generated during each synchronization process, said method comprising the steps of:
- a) collecting the phase parameters for a number of the synchronization processes;
- b) generating a set of Poincaré coordinate data from the phase parameters collected in step a);
- c) analyzing distribution of the set of Poincaré coordinate data generated in step b) on a Poincaré map; and
- d) determining that the signal transmission path is experiencing a shadowing phenomenon when the set of Poincaré coordinate data generated in step b) has a non-elliptical distribution on the Poincaré map, and that the signal transmission path is not experiencing the shadowing phenomenon when the set of Poincaré coordinate data generated in step b) has an elliptical distribution on the Poincaré map.

9. A wireless communications system capable of identifying occurrence of shadowing phenomenon, comprising:
- user end equipment including a user signal-receiving device and a user signal-transmitting device; and
- system service end equipment including a system signal-transmitting device capable of wirelessly transmitting signals to be received by said user signal-receiving device, and a system signal-receiving device capable of wirelessly receiving signals transmitted by said user signal-transmitting device;
- wherein at least one of said user signal-receiving device and said system signal-receiving device periodically executes a synchronization process to evaluate quality of wireless communications conducted through a signal transmission path between said at least one of said user signal-receiving device and said system signal-receiving device, and the corresponding one of said system signal-transmitting device and said user signal-transmitting device, a set of signal-state estimated values that includes a phase parameter being generated during each synchronization process,
- said at least one of said user signal-receiving device and said system signal-receiving device collecting the phase parameters for a number of the synchronization processes, generating a set of Poincaré coordinate data from the phase parameters collected thereby, analyzing distribution of the set of Poincaré coordinate data generated thereby on a Poincaré map, and determining that the signal transmission path is experiencing a shadowing phenomenon when the set of Poincaré coordinate data analyzed thereby has a non-elliptical distribution on the Poincaré map, and that the signal transmission path is not experiencing the shadowing phenomenon when the set of Poincaré coordinate data analyzed thereby has an elliptical distribution on the Poincaré map.

10. The wireless communications system as claimed in claim 9, wherein the signal transmission path is determined by said at least one of said user signal-receiving device and said system signal-receiving device to experience severe shadowing when the set of Poincaré coordinate data analyzed thereby has a circular distribution on the Poincaré map.

11. The wireless communications system as claimed in claim 10, wherein the set of signal-state estimated values generated during each synchronization process further includes a power parameter, the signal transmission path being determined by said at least one of said user signal-receiving device and said system signal-receiving device to experience mild shadowing when the set of Poincaré coordinate data analyzed thereby has a uniform distribution on the Poincaré map, and the power parameters corresponding to the phase parameters collected thereby do not fall within a tolerable range for white noise average power.

12. The wireless communications system as claimed in claim 11, wherein the signal transmission path is determined by said at least one of said user signal-receiving device and said system signal-receiving device to experience complete shadowing when the set of Poincaré coordinate data analyzed thereby has a uniform distribution on the Poincaré map, and the power parameters corresponding to the phase parameters collected thereby fall within the tolerable range for white noise average power.

* * * * *